Nov. 12, 1968   H. PAPST   3,410,510
BOUNDARY LAYER CONTROL
Original Filed Dec. 23, 1963   4 Sheets-Sheet 2
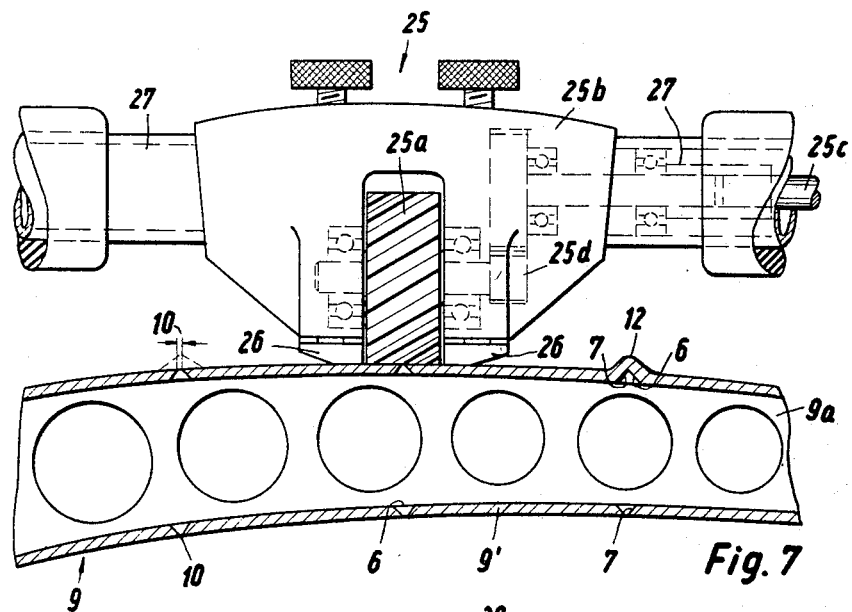
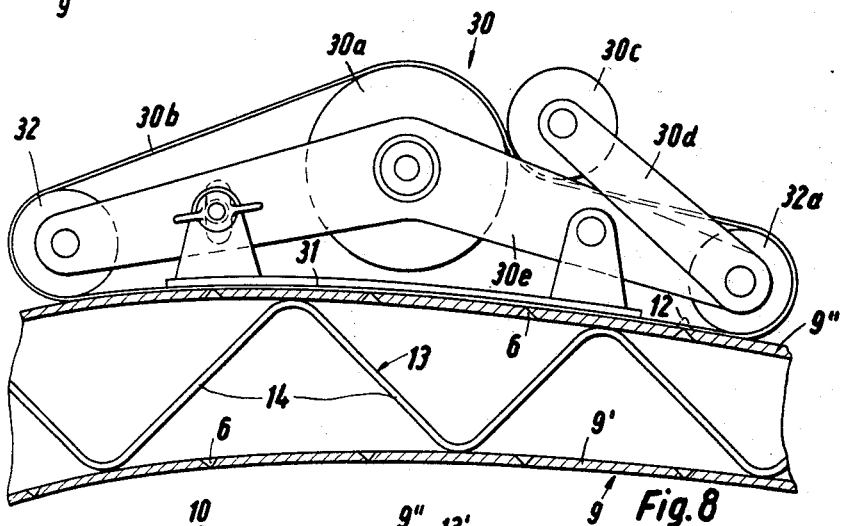
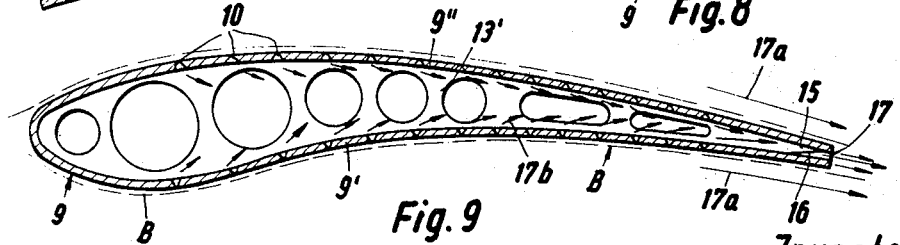
Inventor:
HERMANN PAPST
BY Michael J. Striker
his ATTORNEY

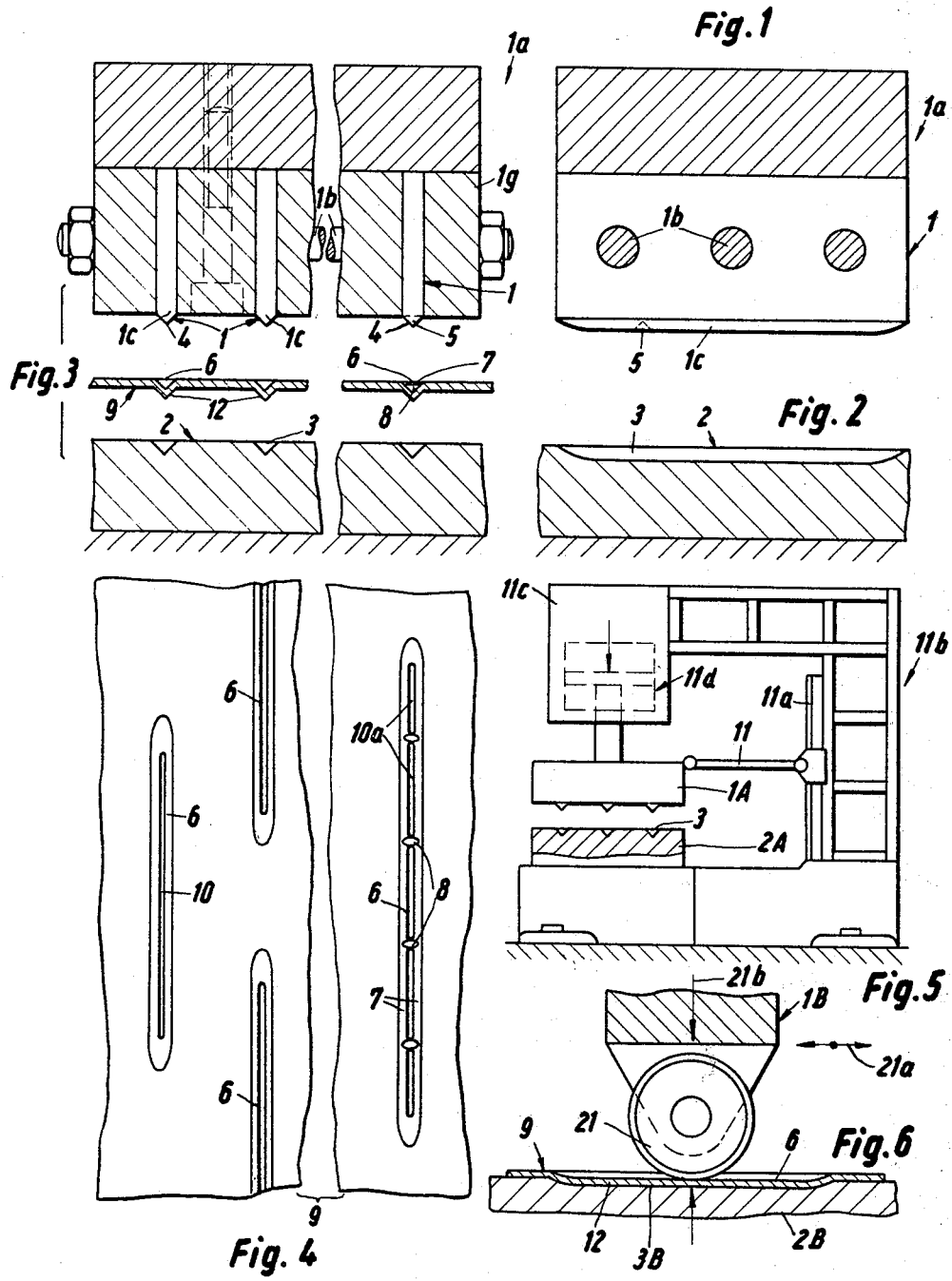

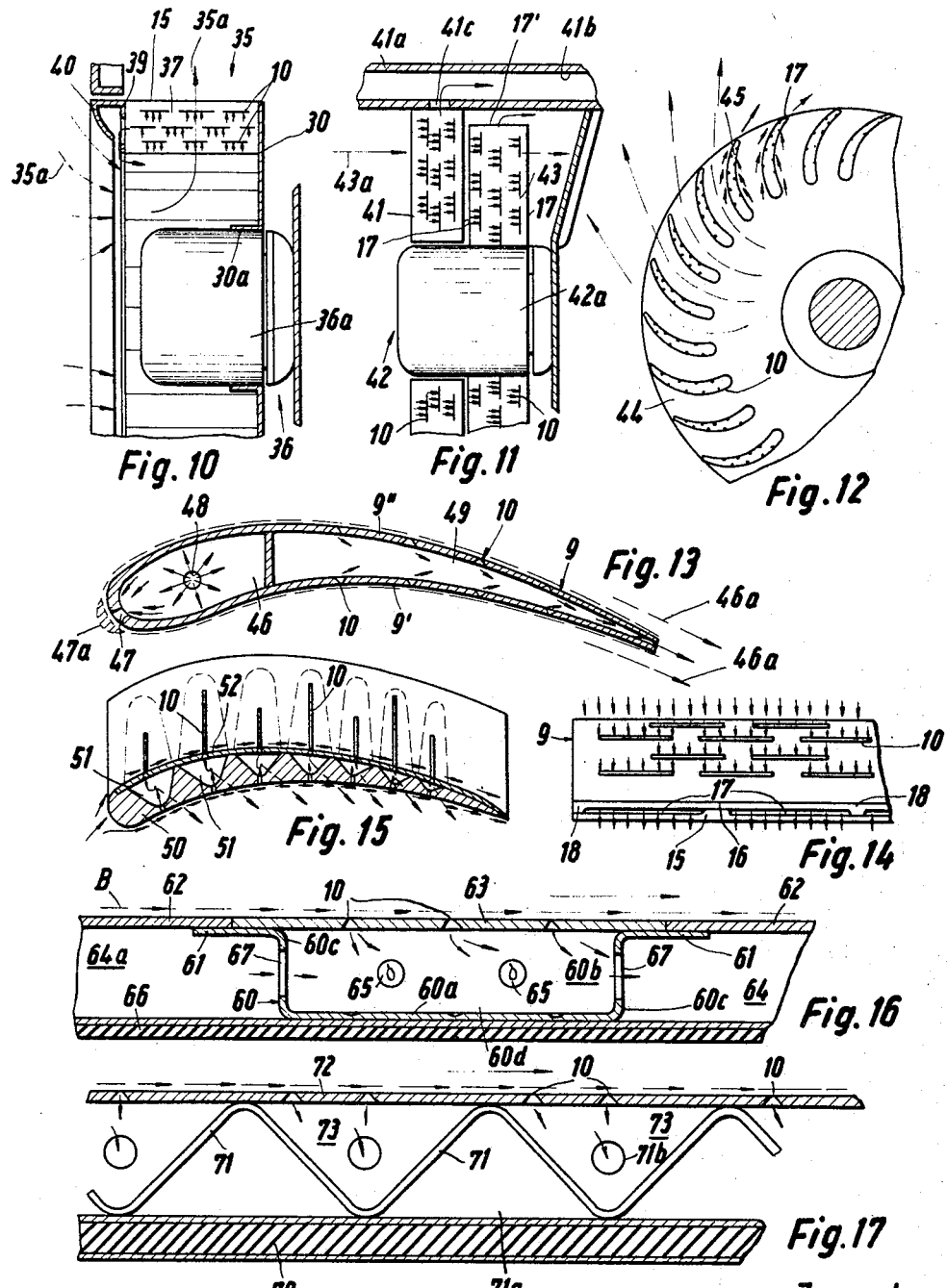

Nov. 12, 1968   H. PAPST   3,410,510
BOUNDARY LAYER CONTROL
Original Filed Dec. 23, 1963   4 Sheets-Sheet 4
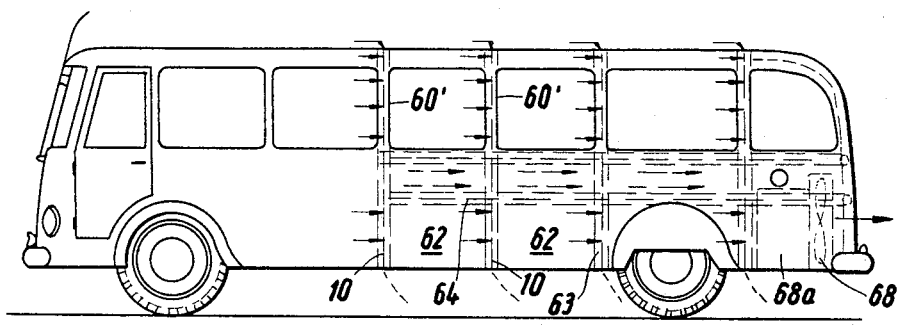
Fig. 18
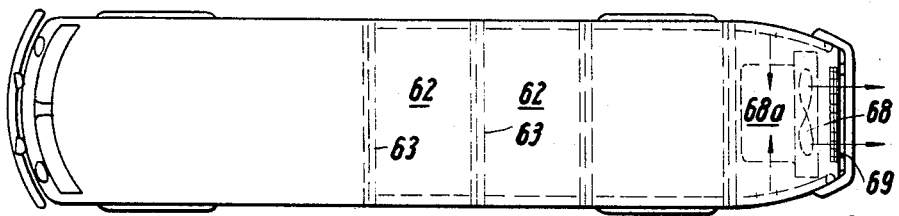
Fig. 19
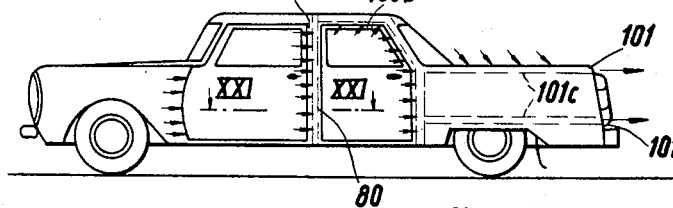
Fig. 20
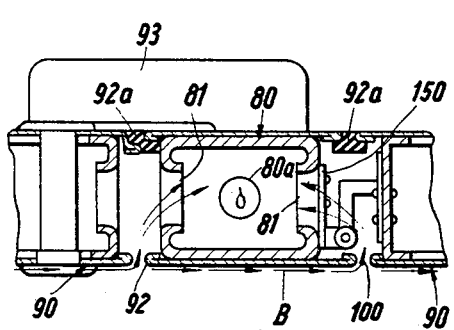
Fig. 21
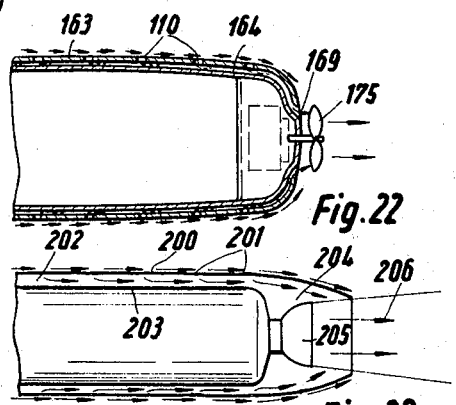
Fig. 22
Fig. 23
Inventor:
HERMANN PAPST
BY Michael S. Striker
his ATTORNEY United States Patent Office 3,410,510
Patented Nov. 12, 1968

3,410,510
BOUNDARY LAYER CONTROL
Hermann Papst, 7742 St. Georgen,
Black Forest, Germany
Original application Dec. 23, 1963, Ser. No. 332,619.
Divided and this application Mar. 16, 1966, Ser.
No. 534,733
Claims priority, application Germany, Dec. 24, 1962,
P 30,859
5 Claims. (Cl. 244—130)

The present application is a division of my copending application Ser. No. 332,619, filed Dec. 23, 1963, now abandoned and entitled, "Boundary Layer Control Means and Method of Producing the Same."

The present invention relates to profiled bodies which come in direct contact with fluid streams, and more particularly to improvements in means for controlling the boundary layer which develops along the outer surfaces of such profiled bodies. Specifically, the invention relates to boundary layer control means which is suitable for use in gliders, all kinds of automotive vehicles, blowers, turbines and many other types of machines wherein at least some component parts come in direct contact with fluid streams.

The problems which arise as a result of the fact that a thin layer of air or water will develop along the exposed surfaces of fuselages, wings, propeller blades, vanes and similar profiled bodies are well known to designers of vehicles, blowers and turbines. Attempts to utilize porous skins have met with little success because the pores will become clogged after comparatively short periods of exposure to a fluid stream and because such pores reduce the smoothness of the skin so that the fluid stream meets greater resistance even if the boundary layer is eliminated. Also, a porous skin is weaker than a non-permeable skin.

Accordingly, it is an important object of the present invention to provide a novel skin construction which is configurated in such a way that it eliminates at least some strata of the boundary layer which develops along the exposed surfaces of airfoils, fuselages, chassis, cowlings, shells and similar profiled bodies which come in direct contact with fluid streams.

A further object of the invention is to provide a profiled body whose skin is constructed and mounted in such a way that it prevents the loosening of boundary layers and that it may simultaneously perform at least one additional function, such as to cool the profiled body, to prevent entry of combustion products into the passenger compartment of a vehicle.

An additional object of my invention is to provide a profiled body which is provided with improved boundary layer control means of the above outlined characteristics and wherein the provision of such boundary layer control means adds little to the initial cost of the profiled body.

A concomitant object of the instant invention is to provide improved boundary layer control means which does not appreciably affect the strength of the profiled body, which may be manufactured and finished in conventional machines, and which may eliminate the boundary layer on all or on selected surface portions of a profiled body.

Still another object of the invention is to provide an improved outer covering or skin for airfoils, fuselages, chassis, cowlings, shells and similar profiled bodies, and to construct the covering in such a way that it permits entry of boundary layer into the interior of the profiled body but is not likely to be clogged by solid or liquid impurities which are contained in the fluid stream.

A further object of the invention is to provide an outer covering which need not consist of porous material and which need not be slotted or apertured in order to eliminate at least some strata of the boundary layer from the chassis of an automotive vehicle or a similar conveyance.

Another object of the invention is to provide an airfoil, such as a wind, propeller blade or vane, which embodies the boundary layer control means of the present invention.

With the above objects in view, one feature of my invention resides in the provision of a profiled body which is arranged to be placed into a fluid stream so that a boundary layer develops during relative movement between said body and the fluid stream. Such body will define an internal space, such as may be the case in a blade, vane, wing, chassis, cowling, fuselage or similar body, and will comprise an outer covering such as a sheet of skin material, having an outer side along which the boundary layer develops and an inner side. This covering will further be provided with a plurality of elongated narrow slots whose width essentially increases in a direction from said outer side toward said inner side so that the boundary layer may enter the space through these slots caused by the essentially increasing of their width by deflection at an angle of substantially less than 90 degrees. When a body of the type in question is constructed by placing a sheet of such skin material around the skeleton frame of an airfoil in such a way that the narrower ends of the slots are located at the outer side of the thus obtained outer covering or skin, any foreign matter which will eventually penetrate into the slots cannot remain therein because the width of the slots essentally increases inwardly. Also, each slot is preferably bounded by inclined faces which diverge inwardly, i.e., in a direction from the exposed side toward the concealed side of the skin so that, and if the pressure in the interior of the airfoil is less than the pressure of the surrounding fluid, the boundary layer is actually sucked into the body and undergoes minimal deflection (substantially less than 90 degrees) while flowing through the slots. The slots are preferably but need not always be perpendicular to the direction of fluid flow, and they may be staggered with reference to each other so as to insure that the boundary layer may be removed from all sections of the outer surface.

The sharp edges of the skin at both sides of each slot will actually peel the boundary layer and will compel it to penetrate through the slots and into the interior of a profiled body in which the skin is used as an outer covering.

If the outer side of the skin is thereupon coated with one or more layers of lacquer, paint or the like, such materials cannot clog the slots because the width of the slots increases in a direction from the inner side to the outer side of the skin.

The novel features which are considered as characteristic of the invention are set forth in particular in the appended claims. The improved boundary layer control means itself, however, both as to its construction and the method of producing the same, together with additional features and advantages thereof, will be best understood from the following detailed description of certain specific embodiments with reference to the accompanying drawings, in which:

FIG. 1 is a vertical section through a ram constituting one shaping die of an embossing apparatus for the production of skins which embody the boundary layer control means of the present invention;

FIG. 2 is a section through a matrix which constitutes another shaping die of the embossing apparatus;

FIG. 3 is a vertical section through the embossing apparatus showing the ram in idle position and further showing a portion of a skin which is deformed by the working ends of embossing tools on the ram;

FIG. 4 is a fragmentary side elevational view of a finished skin;

FIG. 5 illustrates a portion of a modified embossing apparatus with the matrix partly broken away;

FIG. 6 illustrates a third embossing apparatus wherein the ram carries a roller-shaped embossing tool;

FIG. 7 is a front elevational view of a milling machine which is utilized for removing ridges from a skin which forms the outer covering of an airfoil;

FIG. 8 is a side elevational view of a polishing machine which is used for precision finishing of the skin after the skin has been treated by the milling machine of FIG. 7;

FIG. 9 is a transverse section through a modified airfoil which comprises a skin of the type shown in FIG. 8;

FIG. 10 is a fragmentary axial section through a radial blower whose blades are provided with skins embodying my invention;

FIG. 11 is a fragmentary axial section through an axial blower whose blades and vanes are constructed in a manner as shown in FIG. 9;

FIG. 12 is a fragmentary front elevational view of an impeller whose blades resemble the airfoil of FIG. 9;

FIG. 13 is a section through a turbine blade which is provided with a skin of the type shown in FIG. 4;

FIG. 14 is a fragmentary front elevational view of a modified blade;

FIG. 15 is a section through a different turbine blade;

FIG. 16 is a fragmentary section through the fuselage or chassis of a conveyance which comprises an outer covering embodying the boundary layer control means of my invention;

FIG. 17 is a similar section through a modified fuselage or chassis;

FIG. 18 is a side elevational view of a bus whose chassis is constructed in accordance with my invention;

FIG. 19 is a top plan view of the bus;

FIG. 20 is a side elevational view of a passenger automobile whose chassis is constructed in accordance with my invention;

FIG. 21 is an enlarged horizontal section as seen in the direction of arrows from the line XXI—XXI of FIG. 20;

FIG. 22 is a section through the rear portion of a watercraft whose hull is constructed in accordance with my invention; and FIG. 23 is a section through the tail end of a jet engine whose wall structure embodies my invention.

To facilitate understanding of the invention I have shown in FIGS. 1–3 and 5–8 various devices which may be used in making my boundary layer control means, whereas the remaining figures illustrate the outer covering or skin itself and various applications to which it may be put.

Referring to FIGS. 1 to 3, there is shown an embossing apparatus which comprises a set of shaping dies including a matrix 2 whose upper side is provided with elongated grooves 3, and a ram 1a having a plurality of embossing tools 1 detachably secured thereto by a series of bolts 1b so that the precision-finished, smooth-surfaced, wedge-shaped elongated working ends 1c of the tools 1 register with the grooves 3. The ram 1a is reciprocable toward and away from the matrix 2, or vice versa, whereby the working ends 1c deform a skin 9 which is placed onto the upper side of the matrix so as to overlie the grooves 3. This skin is a sheet of aluminum alloy and the working ends 1c impress in the upper side thereof a series of staggered but parallel depressions 6 of triangular cross section whereby the underside of the sheet is provided with complementary ridges 12. The height of the working ends 1c exceeds slightly the thickness of the skin 9 so that the depth of each depression 6 also exceeds the thickness of the skin. The depressions 6 are bounded by smooth inclined faces 7 which diverge in a direction from the underside toward the upper side of the skin 9. Subsequently, the ridges 12 are removed by a suitable milling, polishing, grinding or planing machine (two embodiments of such machines will be described in connection with FIGS. 7 and 8) whereby the skin is formed with narrow slots 10, see FIG. 4, whose width increases in a direction from the underside toward the upper side of the sheet material. The ridges 12 are removed in such a way that the underside of the skin 9 is smooth and that it merely shows the narrower ends of the slots 10. The upper side of the skin is provided with the depressions 6 whose longitudinal ends are preferably rounded in a manner shown in FIG. 4, and such roundness is due to the configuration of grooves 3 in the upper side of the matrix 2.

If the slots 10 are comparatively long, at least some of the working ends 1c may be provided with channels 5 extending transversely of the edges 4 so that the material of the skin 9 forms a series of webs 8, shown in FIG. 4, which divide the respective slot into a series of aligned sections 10a. The webs 8 improve the resistance of the skin to bending or twisting stresses and such webs are of particular advantage when the slots are comparatively long, when the slots are closely adjacent to each other, and/or when the material of the skin 9 is readily deformable. The slots are staggered in such a way that they extend along the full length or width of the skin 9, depending on the position of the skin on a profiled body which is placed into a fluid stream. For example, and if the skin of FIG. 4 forms the outer covering of an airplane wing, the wing moves in a direction from the left to the right, or vice versa, so that the slots 10, 10a extend substantially transversely of the fluid stream and at least some strata of the boundary layer developing along that side of the skin which is exposed to the fluid stream will flow continuously and with minimal deflection first through the slots and thereupon along the other side of the skin. In actual use, the outer side of the skin is that side from which the inclined faces 7 diverge outwardly, i.e., in FIG. 3 the outer side is the underside of the skin 9, and FIG. 4 shows the inner side of this skin. The inclined faces 7 direct the strata of the boundary layer during their flow through the slots 10, 10a and insure that the boundary layer must be deflected through an angle of substantially less than 90 degrees. This reduces turbulence in the interior of the profiled body.

When the working ends 1c penetrate into the upper side of the skin 9, and when the embossing apparatus is closed, the skin is held flat between the underside of the ram 1a and the upper side of the matrix 2 so that the surfaces of the skin remain smooth and that the working ends 1c merely shift certain layers of the material of the skin. The height and the inclination of surfaces on the working ends 1c will determine the width of the slots 10, i.e., the same embossing apparatus may be used for forming different slots merely by exchanging the embossing tools. The lower part of the ram 1a carries a series of spacer elements 1g which enable the operator to change the distance between the embossing tools 1 so that the ram may be used with different matrices. All such features contribute to greater versatility of the embossing apparatus.

The working ends 1c will not sever or rip through the material of the skin but merely cause plastic deformation of its material. Since the faces of the working ends 1c are smooth, they cannot produce fissures or similar defects in the skin, especially since the upper side of the matrix is preferably finished with great precision. The slots 10, 10a are not likely to become clogged by paint, lacquer, rain, dust, sleet or snow because they diverge inwardly so that any matter which has penetrated through the narrow outer ends of the slots is free to enter the interior of the profiled body which is surrounded by the skin. This is of particular importance in road vehicles and in watercraft wherein the outer covering is exposed to dust, mud or water, and such configuration of the slots is of equal importance when the outer covering is coated with paint, lacquer or the like.

FIG. 5 illustrates a modified embossing apparatus which is especially suited for shaping of large skins such as may form part of the fuselage or wings in an airplane or the outer covering of another vehicle, e.g., an automobile, bus, truck, glider, boat or the like. The apparatus comprises one, two or more reciprocable rams 1a which are guided by one or more arms 11 and which cooperate with one or more fixed matrices 2a. The arms 11 are slidable along vertical ways 11a mounted on a frame 11b, and this frame comprises an overhanging head 11c which accommodates a hydraulic or pneumatic reciprocating mechanism 11d for the rams 1a. The matrices 2a and the rams 1a may be located in inclined planes, depending on the configuration and dimensions of the skins to be treated.

If desired, the fluid-operated reciprocating means 11d may be replaced by a simple lifting mechanism which serves to move the rams 1a away from the matrices 2a whereupon the rams are released to descend by gravity and to thereby deform a sheet which overlies the matrices. However, it is normally advisable to provide hydraulic or pneumatic reciprocating means which cause the rams to descend at high speed and to strike against a skin with a force sufficient to produce the ridges 12 in a single operation. It is also possible to deform the skin by pressure waves produced by impulse generators or explosions while the skin is immersed in a fluid medium.

FIG. 6 illustrates a third embossing apparatus wherein the matrix 2b cooperates with a ram 1b which carries one or more roller-shaped embossing tools 21. The skin 9 is placed onto the upper side of the matrix 2b and the tool 21 is caused to move in the longitudinal direction of the groove 3b (see the double-headed arrow 21a) while the ram 1b exerts a pressure in a direction toward the matrix (arrow 21b). The tool 21 may be moved back and forth only once or more than once, depending on the thickness and rigidity of the skin 9.

Referring to FIG. 7, there is shown a portable milling machine 25 having a rotary milling cutter 25a which serves to remove the ridges 12. The cutter 25a travels between pairwise arranged guide rollers 26 and its housing 25b comprises two handles 27 which may be grasped by hand to move the milling machine in the longitudinal direction of the ridges 12. One of the handles 27 accommodates or carries a motor (not shown) which drives a shaft 25c serving to rotate the cutter 25a through a gear train 25d. The skin 9 forms the outer covering of an airfoil and is applied to the skeleton frame 9a of the airfoil in such a way that the ridges 12 extend beyond the outer side thereof, i.e., beyond that side which is exposed to the fluid when the airfoil moves with respect to a fluid stream or vice versa. The edges of the milling cutter 25a remove all such material which extends beyond the outer side of the undeformed (non-embossed) portion of the skin 9 whereby the skin is provided with narrow slots 10 which are substantially parallel with the leading and trailing edges of the airfoil. Each slot 10 diverges in a direction from the outer side toward the inner side of the skin 9 and each such slot is bounded by two smooth inclined faces 7. An important advantage of the just described mode of assembling and finishing the air foil of FIG. 7 is that removal of the ridges 12 takes place simultaneously with thorough and precise finishing of the exposed side of the skin 9. Since such precision finishing is normally needed irrespective of the provision of boundary layer control means, removing the ridges 12 does not consume any additional time because it is incidental to precision-treatment of the skin. The rollers 26 prevent penetration of the cutter 25a into the non-deformed portions of the skin, and FIG. 7 shows that the lower panel 9' of the skin 9 is already free of ridges 12 so that it merely exhibits a series of suitably distributed slots 10.

If the skin must be finished with utmost precision, one can resort to a grinding or polishing machine 30, for example of the type which is shown in FIG. 8. This machine may be used in addition to or as a substitute for the milling machine 25 and comprises an endless grinding or polishing belt 30b which is trained around rollers 30a, 32, 32a to travel across the slots 10. One of these rollers is driven in a manner not forming part of my invention, and the belt 30b is tensioned by a fourth roller 30c which is mounted on a spring-biased arm 30d. The frame 30e of the machine 30 carries an arcuate deflector 31 which is adjustable and which bears against the inner side of the belt 30b. The curvature of the deflector 31 corresponds to the curvature of an upper panel 9" forming part of a skin 9 which surrounds the skeleton frame of the airfoil. When the machine 30 polishes the lower panel 9' of the skin 9, the operator replaces the deflector 31 by a differently configurated deflector. Alternatively, the deflector 31 may consist of elastically deformable material so that it follows the outline of the panel 9' or 9".

The skeleton frame of the airfoil comprises a transversely extending corrugated frame member 13 whose sections 14 extend between the panels 9', 9". If the structure shown beneath the machine 30 forms part of a fuselage, the member 13 is a bulkhead and forms an annular stiffener whose inner and outer sides are respectively surrounded by tubular skins 9', 9".

Finishing of the airfoil of FIG. 7 or 8 may be carried out as follows: First, the embossed skin 9 is stretched onto and is connected with the skeleton frame 9a or 13 so that its ridges 12 extend outwardly. These ridges are then removed by the milling cutter 25a and, finally, the outer side of the skin is precision-finished by the belt 30b. If the material of the belt can remove the ridges 12 without previous milling, the machine 25 may be dispensed with.

It goes without saying that the ridges 12 may be removed by many other types of existing milling, grinding or planing machines, and that such ridges may be removed before the skin is mounted on a skeleton frame. For example, one may utilize automatic milling machines with copying means or a large skin may be treated simultaneously by two or more automatic, semiautomatic or portable machines.

The length of slots 10 should be selected in such a way that the edges bounding each slot remain parallel to each other even if the skin 9 is deformed, for example, at the time it is applied around the skeleton frame of an airfoil, chassis, cowling, fuselage or the like. As a rule, the width of the slots 10 need not substantially exceed one millimeter and may be a small fraction (one or more tenths) of a millimeter.

It is normally preferred to remove the ridges 12 subsequent to deformation of the skin 9, especially if the skin consists of thin and readily deformable sheet material, because the likelihood that the slots 10 would be of unequal width is more pronounced if the slots are formed prior to deformation (shaping) of the skin. It is also conceivable to form the slots 10 by grinding or by erosion with spark discharge, but such methods are costlier than the embossing method.

FIG. 9 illustrates in section an airfoil, e.g., the wing of an aircraft or a blade in a turbine or blower whose outer covering consists of a skin 9 which is provided with boundary layer control means embodying my invention. The skin comprises a lower panel 9' and an upper panel 9" both surrounding an apertured skeleton frame 13'. The panels are provided with elongated knife blade-like edge portions 15 which extend along the trailing edge of the airfoil and which are held apart by spacer elements 16 so that the edges 15 define between themselves a series of orifices 17. Such orifices are of advantage irrespective of the exact configuration of slots 10 in the panels 9', 9" as long as the skin 9 allows at least some strata of the boundary layer B (shown in broken lines) to enter the interior of the airfoil. When the airfoil is caused to move with reference to the fluid stream or vice versa, there develops a low-pressure zone immediately downstream of the orifices 17 so that the orifices actually suck fluid from the interior of the airfoil to draw the boundary layer through the slots 10. The flow of the fluid stream is indicated by arrows 17a and the flow of the boundary layer B through the slots 10 is indicated by arrows 17b. Thus, the provision of orifices 17 results in increased flow of the boundary layer into and through the slots 10 so that the edges 15 actually form a suction nozzle which draws the boundary layer into the airfoil and which thereupon injects the thus accumulated body of fluid into the low-pressure zone along the trailing edge of the airfoil. In other words, the nozzle will cause deflection of the boundary layer so that at least some strata of this layer will penetrate through the slots 10 which extend transversely of the fluid stream.

FIG. 10 illustrates a portion of a radial blower 35 which comprises a series of hollow radially arranged blades 37. One axial end of each blade 37 is welded to a disk 30 whose flange 30a is secured to the rotor 36a of an electric motor 36. The other axial end 39 of each blade 37 is soldered to a hollow annulus 40 which rotates with the rotor 36a whereby the channels between the blades 37 receive streams of fluid from the suction side of the blower and such streams flow in directions indicated by the arrows 35a. The blades 37 are constructed in a manner as illustrated in FIG. 9 so that the inner strata of the boundary layer may enter through the slots 10 and are expelled through orifices defined by the nozzles 15 at the outer ends of the blades. The pressure in the channels between the blades 37 exceeds the pressure in the interior of the blades so that the boundary layer is compelled to enter the blades whereby the streams of fluid meet less resistance in flowing toward the pressure side of the blower with resultant increase in the efficiency and operating range of the blower. The slots 10 are substantially parallel to the axis of the rotor 36a.

FIG. 11 shows a portion of a multistage axial blower whose motor 42 includes a rotor 42a supporting a ring of moving blades 43 each constructed in a manner as illustrated in FIG. 9, i.e., each blade defines at least one orifice 17 located at the pressure side of the ring. The blades 43 cooperate with a ring of stationary vanes 41 which are also constructed in a manner as described in connection with FIG. 9 and which are located at the suction side of the blower. The vanes 41 are carried by a tubular support 41a which defines a duct 41b and comprises ports 41c through which fluid entering the slots 10 of the vanes 41 may be led away. The main streams of fluid flow in directions indicated by arrows 43a. Such strata of the boundary layer which enter through the slots 10 of the blades 43 are evacuated through the orifices 17 and flow toward the pressure side of the blower. The blades 43 are further provided with orifices 17' at the outer ends thereof so that at least some fluid of the boundary layer will escape by centrifugal force when the motor 42 is in operation. The support 41a carries additional rings of stationary vanes (not shown) which discharge fluid into the duct 41b.

FIG. 12 illustrates a portion of an impeller wheel 44 which is provided with arcuate blades 45. These blades are constructed in a manner as illustrated in FIG. 9, and each thereof has at its outer end an orifice 17. When the wheel 44 rotates, the fluid which enters through the slots 10 of the blades 45 is expelled through the orifices 17 to increase the efficiency of the apparatus in which the impeller wheel is in use.

Referring to FIG. 13, there is shown a portion of a blade which is installed in a gas turbine, especially in a gas turbine which is used in connection with exceptionally hot fluids. The front portion of the blade defines a compartment 46 for a suitable coolant which is discharged through one or more openings 47 provided in the leading edge of the blade. There is a deflector 47a, located in front of the openings 47, to direct thin streams of coolant along the outer sides of the panels 9', 9" so that such streams separate the hot fluid (arrows 46a) from the panels. For example, the coolant which enters the compartment 46 may be air, water vapor, nitrogen, carbon dioxide or another non-oxidizing gas. The compartment 46 receives coolant through one or more nozzles 48 which discharge the coolant at high pressure so that a layer of such coolant will be caused to flow from the openings 47 along the outer sides of the panels 9', 9" without causing any turbulence. The pressure of coolant entering 48 must exceed the pressure of the fluid stream which opposes the outflow of coolant through the openings 47. It will be noted that the front portion of the skin 9 which surrounds the compartment 46 is not slotted.

The deflector 47a shields the coolant issuing from the openings 47 so that such coolant cannot meet the fluid stream head on and is automatically deflected to flow along the outer sides of the panels 9', 9". It was found that such coolant will form a coat at least along the upper panel 9" when the turbine is in actual use.

As the layers of coolant continue to flow along the outer sides of the panels 9', 9", they are sucked through the slots 10 and enter the rear compartment of the blade to be expelled through the orifices at the trailing end in the same way as described in connection with FIG. 9. Thus, the layers of coolant form a protective coat which prevents direct contact between the stream of hot fluid and the material of the skin 9. The skin 9 of FIG. 13 preferably consists of a nickel or chrome alloy and is treated in a manner as described in connection with FIGS. 1 to 8.

FIG. 14 shows the outer end portion of a hollow turbine blade wherein the leading edge is parallel with the trailing edge. The blade comprises a skin 9 which is formed with staggered slots 10, and the panels of this skin form at the trailing edge a series of suction orifices 17. The edges 15, 16 of these panels are provided with spacer elements in the form of lugs 18 which are formed by removing the material at the inner sides of such edges so that each orifice extends between a pair of adjacent lugs 18. Each lug 18 of one panel is welded to the other panel, preferably by an impulse welding process and in such a way that all lugs are welded in a single operation. Such mode of welding insures that any melting of the skin is restricted to immediate vicinity of the lugs. The blade of FIG. 14 is equally useful in aircraft, e.g., it may form the wing of an airplane.

FIG. 15 illustrates a portion of an airfoil, such as a blade in a turbine, a radial blower or the like. This blade comprises a forged skeleton profile 50 one side of which is provided with cutouts or grooves 51 extending toward the root of the blade. The cross-sectional area of each cutout increases gradually in a direction toward the tip of the blade so tht the blade can withstand substantial centrifugal forces and considerable bending or twisting stresses. The cutouts 51 are covered by a skin 9 having slots 10 which communicate with the cutouts so that the boundary layer may penetrate into the cutouts when the blade of FIG. 15 rotates. If desired, the profile 50 may be provided with additional cutouts at the underside thereof and the skin 9 then surrounds both sides of the profile. The skin preferably consists of high-quality metallic material and is welded to the profile 50. The outer end of each cutout 51 is open and communicates with the surrounding atmosphere so that the material of the boundary layer is free to escape when the blade rotates. It was found that the blade of FIG. 15 will not vibrate when it is used in a turbine or a similar fluid displacing machine.

FIGS. 16 to 23 illustrate additional structures in which the boundary layer control means of my invention may be put to use. FIG. 16 is a section through the framework or chassis of a railroad vehicle or bus which comprises a skeleton frame including a series of U-shaped bulkheads 60 (only one shown) each having two outwardly extending flanges 61. The flanges 61 are welded to sheet metal sections 62 and to a skin 63 which is disposed between the sections 62 and is spaced from the web 60a of the bulkhead 60. The skin 63 is provided with slots 10 which enable at least some strata of the boundary layer B to enter the space 60b betwen the skin 63 and web 60a. The legs 60c of the bulkhead 60 are formed with openings 67 and the bottom wall 60d of the bulkhead is provided with apertures 65 through which condensate or rain may escape from the space 60b. A channel 64 communicates with a suction nozzle or with the intake of a suction generating device (not shown) to draw the boundary layer through the slots 10, through the righthand opening 67 and through the channel 64. Thus, the space 60b is maintained at a pressure which is less than the pressure prevailing at the outer side of the skin 63 whereby the boundary layer is compelled to flow through the slots 10 and is led away through the channel 64.

The web 60a is secured to an insulating wall 66 which may comprise several layers and which surrounds the passenger compartment or compartments of the vehicle. A second channel 64a collects the fluid of a boundary layer which is withdrawn through the slots of a second skin 63, not shown in FIG. 16.

FIG. 17 illustrates a portion of a fuselage in an airplane. The inner wall 70 is reinforced by undulated bulkheads 71 which stiffen the fuselage and which are surrounded by an outer covering or skin 72 having slots 10 which diverge in a direction toward the inner wall 70. Longitudinal stiffening members 71a are provided with openings 71b to discharge rain or condensate. The members 71a may be omitted if the inner wall 70 is capable of taking up all stresses not taken up by the bulkheads 71. The spaces 73 between the illustrated bulkhead 71 and the skin 72 will receive streams of boundary layer and convey such fluid to a compressor which may deliver it into the passenger compartment. If desired, the boundary layer entering the spaces 73 may be withdrawn by a suction generating device to be delivered into the combustion chamber of a jet engine.

The skin 72 may consist of several sections which are preferably welded to the bulkhead 71.

FIGS. 18 and 19 show a bus whose outer covering comprises sections 62 and skins 63, the latter provided with slots 10 to permit entry of boundary layer into channels 64 which lead to the suction side of a cooling fan 68. This fan cools the engine 68a which is installed in the rear end of the hollow chassis and expels the fluid through one or more suction nozzles 69. It is normally sufficient if the skins 63 cover the reinforcing frame members or posts 60' between the windows of the bus, and such frame members may be configured in a manner as shown at 60 in FIG. 15. The channels 64 extend between adjacent frame members 60' and insure that fluid entering the slots 10 may be collected by the fan 68 to be thereupon expelled at the tail end of the chassis. Of course, at least some of the sections 62 may be formed with additional slots to remove the boundary layer from zones extending between the skins 63.

The streams of air flowing through the channels 64 will cool the chassis and the power requirements of the fan 68 are more than compensated for by reduced resistance which the vehicle meets owing to elimination of the boundary layer.

FIG. 20 shows a passenger automobile whose outer covering comprises sections or skins defining slots 100a for entry of the boundary layer along the outer sides of the frame members or posts 80 adjacent to the doors of the vehicle. Additional slots 100b are defined by skins which surround the rear windows. Such slots 100a, 100b are formed during making of the chassis when the sections of the outer covering are secured to the inner frame.

FIG. 21 shows that the post 80 is hollow and is formed with openings 81 (corresponding to the openings shown in FIG. 15) to permit entry of fluid which is sucked through the slots 100a. The post 80 is located between two doors 90 so that the openings 81 are concealed when the doors are closed. The air which forms the boundary layer B is drawn through the slots 101a between the outer covering 92 of the post 80 and the outer coverings of the doors 90 to flow into one or more nozzles 101 provided at the tail end of the vehicle. Channels 101c connecting the openings 81 (and hence the slots 101a, 101b) with the nozzles 101 are shown in FIG. 20.

Sealing strips 92a prevent entry of air into the passenger compartment at the inner side of the post 80. The reference numeral 93 indicates a lock which secures the front door 90 to the chassis.

A check valve including a flap 150 of elastic material is provided to prevent exhaust gases from flowing through channels 101c and into the interior of the post 80.

It will be noted that the boundary layer control means of my invention need not always comprise slots which are machined in a sheet material, i.e., it is equally possible to assemble the outer covering of a profiled body or vehicle in such a way that the slots are formed between adjacent sections or skins of the covering.

Some of the slots 100b need not extend exactly at right angles to the direction of fluid flow, and FIG. 20 shows that certain slots 100b are actually parallel or nearly parallel with the direction of forward movement of the automobile. Any moisture which might penetrate into the interior of the post 80 or into the channels 101c will be evacuated through apertures 80a (FIG. 21) or through the nozzles 101.

The nozzles 101 may be distributed at the tail end of the vehicle in such a way that each thereof may expel some of the air which enters through the slots 101a, 101b. The slots may be provided in all such zones of the outer covering where the boundary layer might affect the performance of the vehicle. The system of channels 101c which convey air to the nozzles 101 may include several independent channels or a network of interconnected channels which extend through and/or between the elements of the chassis. If desired, the channels may communicate with the intake of a suction generating device so that the boundary layer is drawn not only by the action of nozzles 101 but is additionally compelled to enter the channels owing to greater difference in pressures prevailing around the covering and in the channels.

The upper suction nozzle 101 of FIG. 20 may serve to evacuate spent air from the rear part of the passenger compartment.

FIG. 22 illustrates the rear portion of a hull in a small watercraft, e.g., a motorboat, whose outer covering comprises a skin 163 having staggered slots 110 and surround an inner wall 164 so that the boundary layer entering through the slots 110 may be evacuated through nozzles 169 located in the region of the propeller screw 175. The bulkheads (not shown) between the outer covering 163 and inner wall 164 are provided with openings so that the outer covering and the inner wall from one or more channels through which the boundary layer may escape at the rear end of the watercraft.

The propeller screw 175 may be surrounded by a tubular mantle (not shown) which also surrounds the nozzles 169. The construction of the hull may resemble the construction shown in FIG. 16 or 17. The nozzles 169 are disposed at the suction side of the screw 175 so that the latter actually sucks the boundary layer through the slots 110. It was found that the watercraft of FIG. 22 will meet less resistance than a watercraft without slots 110 because the fluid stream follows more closely the outline of the hull and the resistance normally offered by the boundary layer is reduced to a minimum. The slots extend substantially transversely to the direction of movement of the watercraft.

FIG. 23 shows a portion of a jet engine wherein a tubular outer covering or skin 200 comprises circumferentially extending slots 201. The channels 202 between the outer covering 200 and a tubular inner wall 203 convey the boundary layer into the space 204 located downstream of the exhaust nozzle 205. The jet 206 of exhaust gases creates suction which is felt in the vicinity of the nozzle 25 and in the channels 202 to draw the boudary layer through the slots 201. Such suction is sufficiently strong to remove the boundary layer with resultant increase in efficiency of the jet engine. The fact that the outer covering 200 surrounds and extends beyond the exhaust nozzle 205 contributes greatly to stronger suction in the channels 202. The wall structure including the covering 200 and the inner wall 203 is reinforced by bulkheads and longitudinal members, not shown.

Without further analysis, the foregoing will so fully reveal the gist of the present invention that others can, by applying current knowledge, readily adapt it for various applications without omitting features that fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A skin construction for profiled bodies which are placed into a fluid stream so that a boundary layer develops during relative movement between such bodies and the fluid, comprising a sheet having an outer side along which the boundary layer develops and an inner side, said sheet further having narrow elongated slots whose width diminishes in a direction from said inner side toward said outer side so at the latter said slots have a constant width not exceeding 1 mm., said slots extending substantially transversely of the direction of movement of the fluid stream and being bounded by mutually inclined smooth planar side walls having sharp edges at said outer side and forming with the general plane of the latter an angle of up to 90 degrees so that the boundary layer may enter said narrow slots by deflection at an angle of substantially less than 90 degrees.

2. A skin construction as set forth in claim 1, wherein said sheet comprises webs extending across at least some of said narrow slots to divide the respective slots into a plurality of sections.

3. A structure as defined in claim 1, wherein said sheet constitutes an outer covering of said profile body and comprises a trailing portion which defines with an adjacent part of the profiled body nozzle means in communicaiton with said internal space so as to aspirate the boundary-layer fluid through said slots as a result of negative pressure caused in said internal spaced by the suction effect of fluid flowing externally about said nozzle means, and to subsequently evacuate the fluid which enters through said narrow slots.

4. A structure as defined in claim 1, wherein said profiled body is an airfoil and wherein said sheet is provided with a plurality of said slots and the latter are staggered longitudinally with reference to one another.

5. A structure as defined in claim 1, wherein said profiled body is the fuselage of an aircraft; and further comprising a skeleton frame at least partly surrounded by said sheet and including a plurality of bulkheads.

References Cited
UNITED STATES PATENTS

| | | | |
|---|---|---|---|
| 2,406,920 | 9/1946 | Stalker | 244—103 X |
| 2,721,715 | 10/1955 | Hoadley | 244—130 |
| 2,821,351 | 1/1958 | Utgoff | 244—42 |
| 3,055,614 | 9/1962 | Thompson | 244—42 X |
| 3,090,584 | 5/1963 | Kuchemann et al. | 244—42 X |

FOREIGN PATENTS

| | | |
|---|---|---|
| 945,397 | 5/1949 | France. |

MILTON BUCHLER, *Primary Examiner.*

B. BELKIN, *Assistant Examiner.*